United States Patent [19]

Saguchi

[11] Patent Number: 4,471,401
[45] Date of Patent: Sep. 11, 1984

[54] SECONDARY ARC EXTINCTION DEVICE

[75] Inventor: Junichi Saguchi, Yokohama, Japan

[73] Assignee: Tokyo Shibaura Denki Kabushiki Kaisha, Kanagawa, Japan

[21] Appl. No.: 386,018

[22] Filed: Jun. 7, 1982

[30] Foreign Application Priority Data

Jun. 5, 1981 [JP] Japan .................................. 56-86486

[51] Int. Cl.³ ............................................. G05F 1/70
[52] U.S. Cl. ..................................... 361/79; 323/210
[58] Field of Search ........................... 361/42, 43, 79; 323/208, 209, 210, 211

[56] References Cited

U.S. PATENT DOCUMENTS

| 1,784,682 | 12/1930 | Schimpf |         |
|-----------|---------|---------|---------|
| 2,050,082 | 8/1936  | Buell   |         |
| 2,824,978 | 2/1958  | Knudsen |         |
| 3,932,808 | 1/1976  | Frank   | 323/210 |
| 4,357,570 | 11/1982 | Schmid et al. | 323/210 |

FOREIGN PATENT DOCUMENTS

| 2710625 | 9/1978 | Fed. Rep. of Germany |         |
|---------|--------|----------------------|---------|
| 11523   | 2/1981 | Japan                | 323/210 |
| 1230830 | 1/1970 | United Kingdom       | 323/210 |
| 807444  | 2/1981 | U.S.S.R.             | 323/210 |

OTHER PUBLICATIONS

"The Application of Controlled Reactive Compensator for Single Pole Switching on Long EHV Line Sections", Woodford, EPRI/IREQ, pp. 348-349, Sep. 19-21, 1979.

"A New Thyristor Controlled VAR Compensator Design"-Hammad et al., Canadian Communications & Power Conference, Oct. 18-20, 1978.

Primary Examiner—Harry E. Moose, Jr.
Attorney, Agent, or Firm—Oblon, Fisher, Spivak, McClelland & Maier

[57] ABSTRACT

A secondary arc extinction device in an electric power system, including a bus bar; an electric power line connected to said bus bar; protective relaying means connected to said bus bar; a first reactance means having a first terminal connected to said electric power line; a second reactance means connected between a second terminal of said first reactance means and ground; line voltage detecting means connected to said electric power line for detecting the voltage of said electric power line; current detecting means coupled to said second reactance means for detecting the current flowing in said second reactance means; and controlling means connected to said second reactance means for controlling the reactance of said second reactance means in response to said protective relaying means, line voltage detecting means and current detecting means.

5 Claims, 6 Drawing Figures

SECONDARY ARC EXTINCTION DEVICE

BACKGROUND OF THE INVENTION

1. Field of the Invention

This invention relates to a secondary arc extinction device for an electrical power system whereby the arcing current (hereinbelow termed secondary arcing) that flows through the distributed electrostatic capacity which exists between the uninterrupted phase or uninterrupted circuit and the breakdown phase when there is accidental grounding of a high-voltage transmission line, even though the circuit breakers at both ends of the line are open, can be extinguished in a short time, thereby shortening the period for which the reclosing circuit is without voltage.

2. Description of the Prior Art

Usually for high-voltage, high-capacity transmission lines, use is made of multi-conductor transmission lines, which have a large distributed electrostatic capacity between the phases or between the circuits. In such transmission lines, when flash-over due to lightning damage etc., occurs in the region of the insulators, even though the circuit breakers at both ends of the transmission line are open, induced current and induced voltage are supplied through the distributed electrostatic capacity which exists between the uninterrupted phase or uninterrupted circuit and the breakdown phase. The result of this is that, for some time, arcing current continues to flow in the region of the insulators, and the breakdown condition is not removed.

FIG. 1 is a circuit diagram of a transmission system showing such a condition. Reference designation 1 denotes the transmission line, 2A and 2B designate the electric station or substation buses, whereby the two ends of the transmission line 1 are connected through circuit breakers CB, C designates the distributed electrostatic capacity that exists between the breakdown phase and the unaffected phases of the transmission line 1, and IF designates the secondary arcing that occurs due to supply of induced current (arrow in the drawing) at the point F where the breakdown occurs, from the uninterrupted phase, through this distributed electrostatic capacity. Consequently, when such secondary arcing occurs in the region of the insulators etc., of the transmission line, as mentioned above, this arcing is not extinguished for some time, so when a single-phase or multi-phase reclosing circuit is made, the reclosing circuit does not have sufficient time for zero voltage, leading to problems in stability of the system. This tendency appears to a marked extent in high-voltage, large-capacity transmission lines, which have a large distributed electrostatic capacity between the lines. For this reason, to realize the ultra-high voltage (UHV) transmission systems of the future, some positive means of secondary arc extinction will be necessary.

A means which has recently been proposed for secondary arc extinction is the use of a fixed reactor device with zero-phase compensation, as shown in FIG. 2. In FIG. 2, reference designation 3 designates the line impedance consisting of the line inductance 6 and the distributed electrostatic capacity 5 which exists between the lines of each phase and the distributed electrostatic capacity 4 which exists between ground and the lines of each phase of the transmission line 1; and 7 designates an arc extinction reactor device which is connected in the service line of the substation. This arc extinction reactor 7 is constructed by connecting one end of each of reactors L1, L2 and L3 to respective phases of the transmission line 1 and connecting their other ends in common, and connecting a neutral point reactor Lg between ground and the common star connection point.

The arc extinction function of this arc extinction device may be explained as follows. The admittance matrix determined by the distributed electrostatic capacity of the transmission line 1 is expressed by formula (1).

$$[Y_C] = \begin{pmatrix} Y_{c11} & -Y_{c21} & -Y_{c31} \\ -Y_{c12} & Y_{c22} & -Y_{c32} \\ -Y_{c13} & -Y_{c23} & Y_{c33} \end{pmatrix} \quad (1)$$

The admittance matrix of the arc extinguishing circuit elements is expressed by formula (2).

$$[Y_L] = \begin{pmatrix} Y_{L11} & -Y_{L21} & -Y_{L31} \\ -Y_{L12} & Y_{L22} & -Y_{L32} \\ -Y_{L13} & -Y_{L23} & Y_{L33} \end{pmatrix} \quad (2)$$

The total admittance of the transmission line 1 is therefore expressed by formula (3).

$$Y = Y_C + Y_L \quad (3)$$

Since the characteristics of the admittance matrices $Y_C$ and $Y_L$ represented by the above formulas (1) and (2) are different, by suitably choosing the value of $Y_L$, the mutual admittance can be made zero, i.e., the distributed electrostatic capacity between the lines can be made zero. In other words, by making the line impedance to indefinite as described above, induced current can be made zero. Secondary arc extinction is thereby made possible.

However, an extinction reactor construction as above cannot make zero the electrostatic induction from the unterrupted lines in the case of jointly used transmission lines. To deal with this case, investigations of a reactive extinction device of the construction shown in FIG. 3 have been made. Specifically, as shown in FIG. 3, an extinction device 8 is constructed in which the ends of reactors L1, L2 and L3 are connected to respective phases of the transmission line 1 of one circuit, while ends of reactors L4, L5 and L6 are connected to respective phases of the transmission line 1 of the other circuit, the other ends of these reactors L1-L6 being connected in common, and a neutral point reactor Lg being connected between ground and this common connection point.

The arc extinction function of an extinction device constructed as above is the same as described earlier. Specifically, the admittance matrix determined by the distributed electrostatic capacity of the transmission lines 1, 1 of the two circuits is expressed by formula (4), as follows:

$$[Y_c] = \begin{pmatrix} -Y_{c11} & -Y_{c21} & -Y_{c31} & -Y_{c41} & -Y_{c51} & -Y_{c61} \\ -Y_{c12} & -Y_{c22} & \cdots & & & -Y_{c62} \\ -Y_{c13} & \cdots & -Y_{c33} & \cdots & & -Y_{c63} \\ -Y_{c14} & \cdots & & -Y_{c44} & \cdots & -Y_{c64} \\ -Y_{c15} & \cdots & & & -Y_{c55} & -Y_{c65} \\ -Y_{c16} & \cdots & & & & -Y_{c66} \end{pmatrix} \quad (4)$$

The admittance matrix of the extinction reactor device 8 is expressed by formula (5), as follows:

$$[Y_L] = \begin{pmatrix} -Y_{L11} - Y_{L21} - Y_{L31} - Y_{L41} - Y_{L51} & -Y_{L61} \\ -Y_{L12} - Y_{L22} \ldots\ldots\ldots\ldots\ldots\ldots & -Y_{L62} \\ -Y_{L13} \ldots\ldots - Y_{L33} \ldots\ldots\ldots\ldots & -Y_{L63} \\ -Y_{L14} \ldots\ldots\ldots\ldots -Y_{L44} \ldots\ldots & -Y_{L64} \\ -Y_{L15} \ldots\ldots\ldots\ldots\ldots\ldots -Y_{L55} \cdot & -Y_{L65} \\ -Y_{L16} \ldots\ldots\ldots\ldots\ldots\ldots\ldots\ldots & -Y_{L66} \end{pmatrix} \quad (5)$$

The total admittance of the transmission lines 1, 1 of the two circuits is therefore expressed in the same way as formula (3) given above, and, by suitably choosing the value of YL, the extinction of secondary arcing can be achieved.

In choosing the value of the admittance $Y_L$ in an extinction reactor device as described above, either the value of $Y_L$ may be made a constant value found by means of the admittance due to the distributed electrostatic capacity, or may be set to a calculated value at which a breakdown phase is extinguished.

However, the admittance due to the distributed electrostatic capacity varies depending on the breakdown phase, and appreciable errors are unavoidable in the calculation of the line constant which forms the reference value for the setting of the optimum calculated admittance. Furthermore, due to the effects of weather conditions, a particular value of $Y_L$ is not necessarily always the optimum value. It is therefore difficult to obtain extinction of the secondary arc in a short time, and the value of $Y_L$ may vary above and below the optimum value. For these reasons secondary arc extinction is often difficult.

SUMMARY OF THE INVENTION

Accordingly, in consideration of the above facts, it is an object of this invention to provide a secondary arc extinction device for an electrical power transmission system, wherein the reactance of the neutral point reactor is varied about the optimum reactance obtained from calculation, with the secondary arc voltage and neutral point reactor current utilized as feedback elements, thereby compensating for any error in the optimum calculated admittance $Y_L$ and thereby enabling the secondary arc to be extinguished in a short time.

Briefly, in accordance with one embodiment of this invention, the above noted and other objects are achieved by providing a secondary arc extinction device which includes a bus bar; an electric power line connected to the bus bar; protective relaying means connected to bus bar; a first reactance means having a first terminal connected to the electric power line; a second reactance means connected between a second terminal of the first reactance means and ground; line voltage detecting means connected to the electric power line for detecting the voltage of the electric power line; current detecting means coupled to the second reactance means for detecting the current flowing in the second reactance means; and controlling means connected to the second reactance means for controlling the reactance of the second reactance means in response to the protective relaying means, line voltage detecting means and current detecting means.

BRIEF DESCRIPTION OF THE DRAWINGS

A more complete appreciation of the invention will be readily obtained as the same becomes better understood by reference to the following detailed description when considered in connection with the accompanying drawings, wherein.

DETAILED DESCRIPTION OF THE PREFERRED EMBODIMENTS

Figure 1:
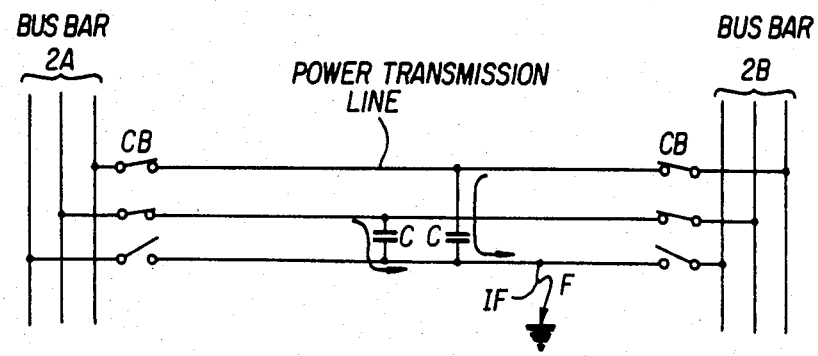
FIG. 1 is a schematic diagram of an electric power transmission system explaining how secondary arcing arises.
Figure 2:
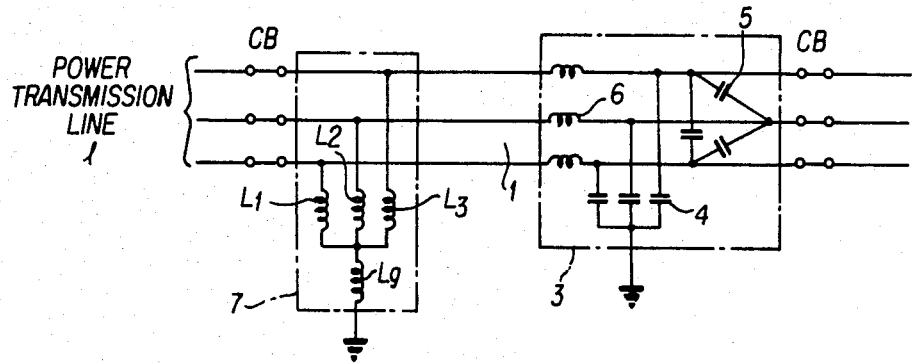
FIGS. 2 and 3 are circuit diagrams of the cases in which a fixed reactor device with zero-phase compensation is provided in a single-line multi-phase transmission line and a multi-line multi-phase transmission line, respectively.
Figure 3:
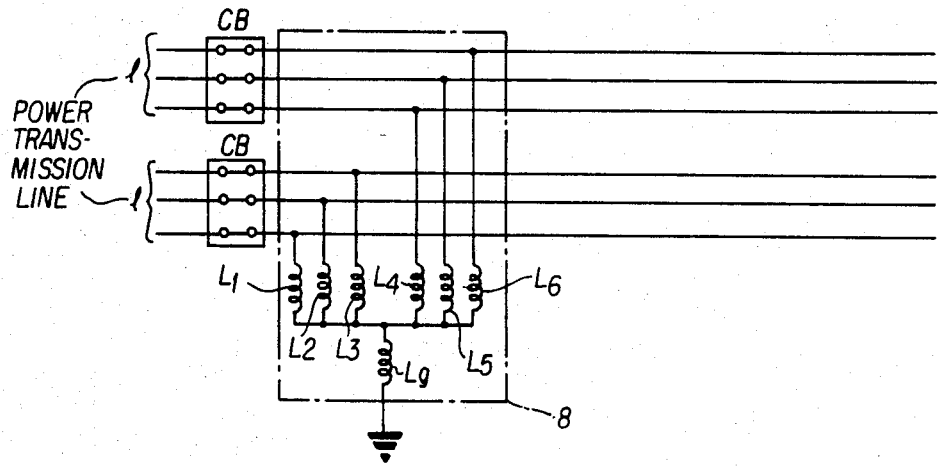
Figure 4:
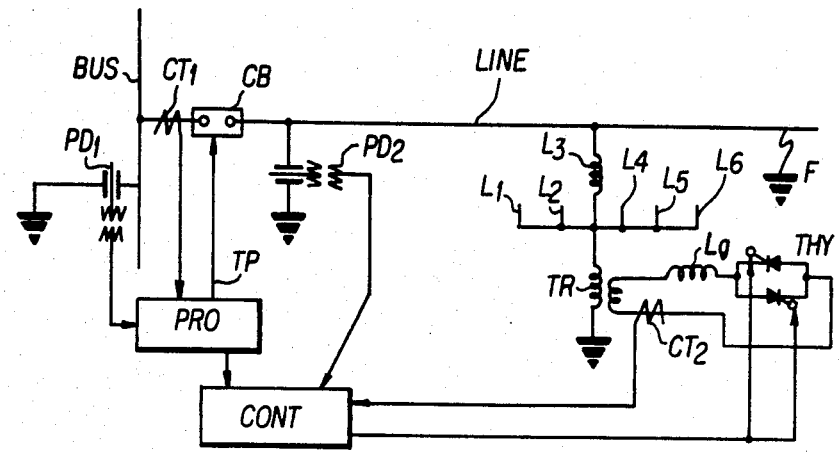
FIG. 4 is a circuit diagram showing an example of a secondary arc extinction device in accordance with this invention.

Referring now to the drawings, wherein like refernce numerals and letters designate identical or corresponding parts throughout the several views, and more particularly to FIG. 4 thereof, wherein one preferred embodiment of a secondary arc extinction device is shown, the designation LINE refers to a transmission line which is connected to a substation bus BUS through a circuit breaker CB. In this case the lines of each phase of a two-circuit transmission line are shown by a single connection. For convenience sake, the line, the bus and the phase reactor of only one phase of the two circuit transmission line shown in FIG. 3 is shown. L1–L6 designate reactors for each phase which are connected in a star configuration to the lines of each phase of the two-circuit transmission line in the service line of the substation. The primary winding of a step-down transformer TR is connected between their neutral point and ground.

The neutral point reactor Lg and a thyristor THY are connected in series with the secondary winding of this transformer TR. The reactance (admittance) of the neutral point reactor Lg is continuously variable by controlling the ignition angle of the thyristor THY. PRO designates a protective relay into which are inputted the current from a current transformer CT1 provided in the transmission line LINE, and the voltage from a potential transformer PD1 connected to the bus BUS. This protective relay PRO is actuated when it detects a fault in the transmission line to deliver a trip pulse TP to the circuit breaker CB. CONT designates an ignition angle controller which starts to operate when it receives an actuation output from the protective relay PRO, and to which are inputted respectively the voltage from a potential transformer PD2 connected to the transmission line LINE, and the current from a current transformer CT2 provided in the secondary circuit of the transformer TR. When its operation is started by means of the actuation output of the protective relay PRO, this ignition angle controller CONT converts the voltage and current signals which are inputted from the potential transfomer PD2 and current transformer CT2 into a DC level, and the ignition angle of the thyristor THY is controlled by ascertaining this level.

Figure 5:
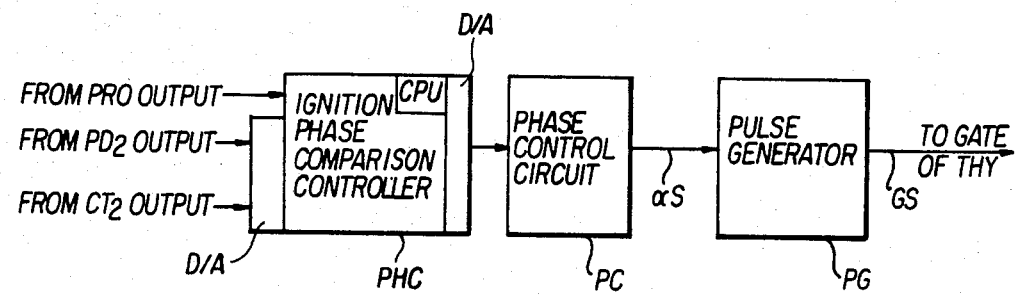
FIG. 5 is a block diagram showing the internal structure of an ignition angle phase comparison controller of FIG. 4.

FIG. 5 shows the internal construction of the ignition angle controller CONT. PHC designates an ignition phase comparison controller to which are inputted, as a start command, the actuation output of the protective relay PRO, and, through an analog/digital converter A/D, the output of the potential transformer PD2 and the output of the current transformer CT2. This phase comparison controller PHC is constructed of a discriminator which contains a memory device, such as a central processing unit CPU. PC designates a phase control circuit to which is applied the PHC output obtained through a digital/analog converter D/A which is provided in the output stage of the ignition phase comparison controller PHC. PG designates a pulse generator to which is applied the output αS of this phase control circuit PC, and which supplies a gate signal GS to the thyristor THY.

The operation of the secondary arc extinction device as above described constructed is nextly explained with reference to FIGS. 4, 5 and 6.

In FIG. 4, when a fault occurs in the transmission line LINE, the transmission line protecting relay PRO detects the fault occurrence, the faulty phase, and the fault mode (box 101 of FIG. 6) and supplies this information as a digital signal to the ignition phase comparison controller PHC of the ignition angle controller CONT shown in FIG. 5. This ignition phase comparison controller PHC applies an analog output corresponding to this fault to the phase control circuit PC. The phase control circuit PC converts the level of the analog quantity into a voltage level corresponding to the ignition angle α, and supplies this to the pulse generator PG. The pulse generator PG sends the gate pulses that are necessary for thyristor ignition at the phase of the ignition angle α so that, in the first instance, the reactance of the neutral point reactor Lg is controlled to the value calculated as optimum for secondary arc extinction (box 102 of FIG. 6).

Now in some cases, as mentioned earlier, due to errors in the determination of the transmission line constant, or to weather conditions, the secondary arc may not be extinguished. The arc voltage is therefore detected by the potential transformer PD2 connected to the transmission line LINE (box 103 of FIG. 6), and sent to the ignition angle phase comparator PHC, which is provided with a discriminator such as a CPU, in the form of a high-speed analog signal obtained by analog/digital converter A/D.

The neutral point reactor current (box 104 of FIG. 6) detected by current transformer CT2 provided beside the neutral point reactor Lg is converted to a high-speed analog signal by the digital/analog converter D/A and sent to the ignition phase comparison controller PHC.

Figure 6:
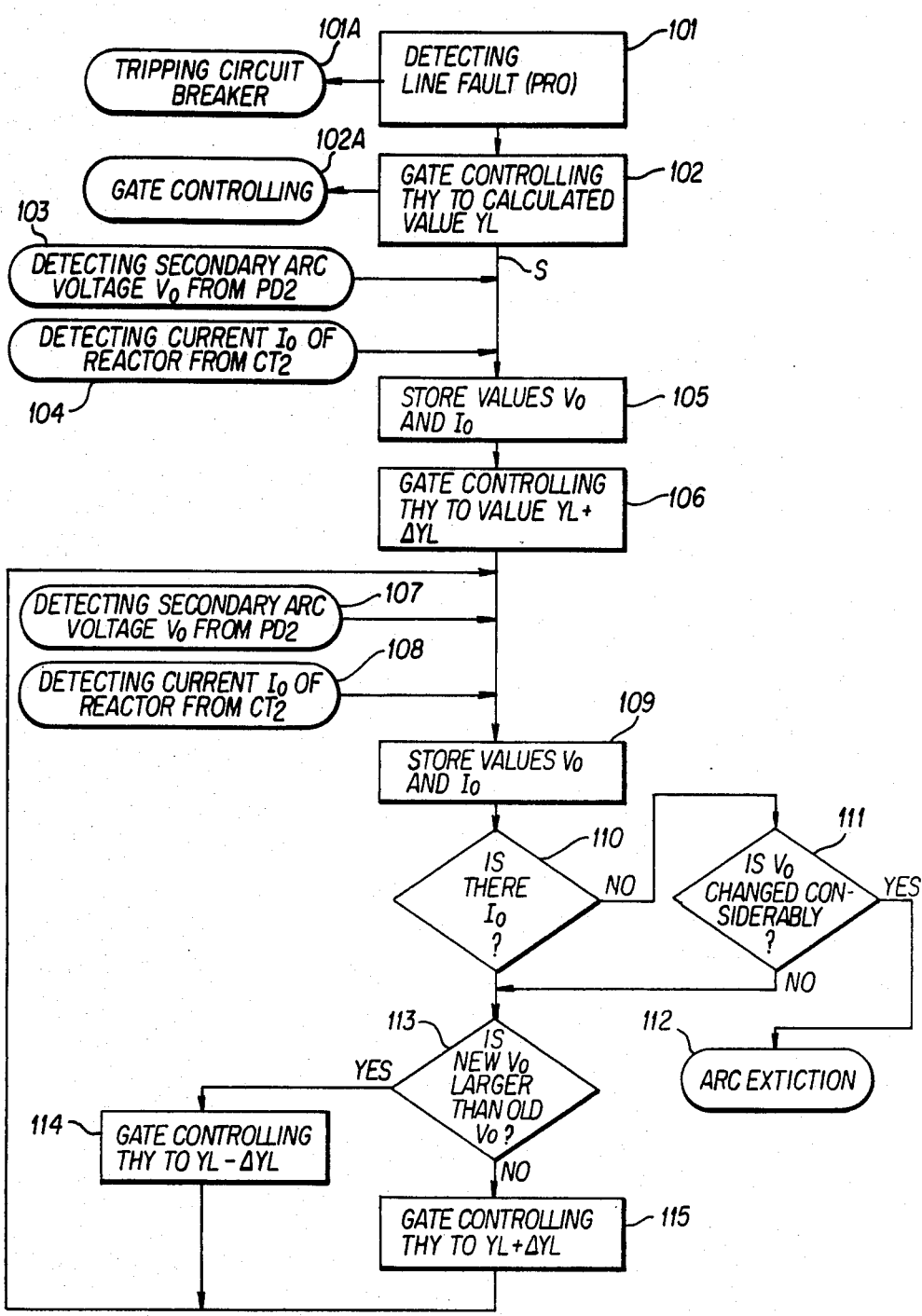
FIG. 6 is a flow-chart showing the operation of the secondary arc extinction device according to this invention.

After the ignition phase comparison controller PHC, as mentioned above, outputs the gate signal to thyristor THY, both the arc voltage detection signal from PD2 and the neutral point reactor current detected signal from CT2 are inputted to and stored in ignition phase comparison controller PHC (boxes 107, 108 and 109 in FIG. 6).

When the output Io of current transformer CT2 exists, i.e., the output Io is not zero or below a predetermined minimum (box 110 of FIG. 6), the current voltage Vo from PD2 detected after gate controlling (box 106) is compared with a previous (old) value of voltage Vo detected when a fault occurs (box 103), (box 113 of FIG. 6).

In response to the result of this comparison, the ignition angle phase controller PHC carries out a control operation whereby it delivers an analog output level which is correspondingly lower (or higher) than the analog output level which was produced before. This analog output is converted to a corresponding ignition angle α1 by the phase control circuit PC, and gate control is carried out by the pulse generator PG to alter the reactance of the neutral point reactor Lg by an amount ΔL. The secondary arc voltage is thereby altered by an amount ΔV.

When the reactance of the neutral point reactor Lg is altered by the amount ΔL, the new arc voltage level (Vo+ΔV) which is subsequently inputted to the analog/digital converted A/D is compared with the previous voltage level (Vo), and if the voltage level (Vo+ΔV) is lower, the ignition angle phase comparison controller PHC outputs an analog level signal for increasing admittance that is even lower than that output by the digital/analog converter D/A (box 115 of FIG. 6).

On the other hand, if the new arc voltage level (Vo+ΔV) is higher than the preceding arc voltage level (Vo), the ignition angle phase comparison controller PHC outputs an analog output level that is ΔV higher than the analog level that was outputted previously (box 114). The reactance of the neutral point reactor Lg therefore changes by ΔL.

This process is repeated, changing the angle of ignition whilst applying feedback such that the secondary arc voltage is minimized and changing the reactance (admittance) of the neutral point reactor Lg whilst comparing with the previous arc voltage. Soon the secondary arc voltage reaches zero, or its minimum, whereupon this arc voltage changes considerably (box 111), and the current level of the neutral point reactor Lg becomes zero.

The secondary arc is thus extinguished (box 112 of FIG. 6) and reclosing of the transmission line becomes possible.

The above explanation concerned the case of an independent secondary arc extinction device. However, with the high-voltage transmission lines of recent years, the same object can be achieved by providing the device at the neutral point of the reactor portion of the reactive power compensator that is connected to the transmission line for transmission stabilization.

As explained above, according to this invention, there is provided a secondary arc extinction device for high-voltage, high-capacity transmission lines whereby, whatever the conditions, (including error in the transmission line constant), control can be achieved to a mutual admittance which is optimum for secondary arc extinction, ensuring secondary arc extinction in a short time, and making the non-voltage period of the single-phase or multi-phase reclosure circuit much shorter, which is very advantageous in electrical power systems.

Thus, although the invention has been explained by way of example of one unit control for controlling neutral point reactor TR-Lg, it should be apparent that phase control for individually controlling phase reactors L1 to L6 can similarly be employed.

That is to say, the transformer TR can be replaced by a fixed neutral point reactor Lg and a variable reactance device including the transformer TR, a reactor Lg', the thyristor THY and current transformer CT2 can be respectively connected between the LINE and the fixed neutral point reactor Lg instead of each respective phase reactor $L_1$ to $L_6$.

Potential transformers PD2 connected to each phase are then connected with respective ignition angle controllers CONT.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A secondary arc extinction device for an electric power system, comprising:
    a bus bar;
    an electric power line connected to said bus bar;
    protective relaying means connected to said bus bar;
    a first reactance means having a first terminal connected to said electric power line;
    a second reactance means connected between a second terminal of said first reactance means and ground;
    line voltage detecting means connected to said electric power line for detecting the voltage of said electric power line;
    current detecting means coupled to said second reactance means for detecting the current flowing in said second reactance means;
    means for detecting the existence of a secondary arc in response to said protective relaying means and said line voltage detecting means; and
    controlling means connected to said second reactance means for controlling the reactance of said second reactance means to extinguish the secondary arc when detected by said detecting means based on said line voltage detecting means and said current detecting means.

2. A secondary arc extinction device as recited in claim 1, wherein said second reactance means comprises:
    a transformer having a primary winding and a secondary winding, said primary winding connected between said first reactance means and ground,
    a semiconductor switching element coupled to said secondary winding of said transformer; and
    a reactor connected between said secondary winding and said semiconductor switching element.

3. A secondary arc extinction device as recited in claim 2, wherein said semiconductor switching element comprises:
    anti-parallel connected thyristors.

4. A secondary arc extinction device as recited in claim 1, wherein said controlling means comprises:
    an ignition phase comparison controlling device which receives signals from said protective relaying means, said line voltage detecting means and said current detecting means, and
    a phase control circuit connected to said ignition phase comparison controlling device for controlling the reactance of said second reactance means in response to said ignition phase comparison controlling device.

5. A secondary arc extinction device as recited in claim 1, comprising:
    said electric power line comprising a multiple phase system having respective power lines for each phase of said system;
    said first reactance means comprising plural inductive reactances, each connected by means of a first terminal thereof to the power line of a respective phase and by means of a second terminal thereof in star connection to each other;
    said second reactance means comprising a single inductive reactance connected between the star interconnection point of said first reactance means and ground; and
    said controlling means extinguishing said secondary arc by controlling the reactance of said single inductive reactance of said second reactance means.

* * * * *